US007366243B1

(12) United States Patent
McCrady

(10) Patent No.: US 7,366,243 B1
(45) Date of Patent: Apr. 29, 2008

(54) METHODS AND APPARATUS FOR TRANSMITTING NON-CONTIGUOUS SPREAD SPECTRUM SIGNALS FOR COMMUNICATIONS AND NAVIGATION

(75) Inventor: Dennis D. McCrady, Holmdel, NJ (US)

(73) Assignee: ITT Manufacturing Enterprises, Inc., Wilmington, DE (US)

( * ) Notice: Subject to any disclaimer, the term of this patent is extended or adjusted under 35 U.S.C. 154(b) by 534 days.

(21) Appl. No.: 10/695,484

(22) Filed: Oct. 29, 2003

(51) Int. Cl.
*H04L 27/00* (2006.01)

(52) U.S. Cl. ...................................... 375/259; 375/130

(58) Field of Classification Search ................ 370/210, 370/203; 375/130, 259, 285, 296, 350, 346, 375/260, 222, 219
See application file for complete search history.

(56) References Cited

U.S. PATENT DOCUMENTS

| | | | | | |
|---|---|---|---|---|---|
| 4,393,276 | A | * | 7/1983 | Steele | 380/28 |
| 4,613,978 | A | * | 9/1986 | Kurth et al. | 375/346 |
| 5,029,184 | A | * | 7/1991 | Andren et al. | 375/138 |
| 5,263,048 | A | * | 11/1993 | Wade | 375/146 |
| 5,271,038 | A | * | 12/1993 | Cai | 375/317 |
| 5,365,544 | A | | 11/1994 | Schilling | |
| 5,410,750 | A | * | 4/1995 | Cantwell et al. | 455/306 |
| 5,436,942 | A | | 7/1995 | Cheng et al. | |
| 5,506,864 | A | | 4/1996 | Schilling | |
| 5,610,908 | A | * | 3/1997 | Shelswell et al. | 370/210 |
| 5,612,978 | A | * | 3/1997 | Blanchard et al. | 375/350 |
| 5,671,247 | A | * | 9/1997 | Souissi et al. | 375/144 |
| 5,883,598 | A | | 3/1999 | Parl et al. | |
| 5,982,324 | A | | 11/1999 | Watters et al. | |
| 6,108,558 | A | | 8/2000 | Vanderspool, II | |
| 6,175,551 | B1 | * | 1/2001 | Awater et al. | 370/210 |
| 6,249,252 | B1 | | 6/2001 | Dupray | |
| 6,275,705 | B1 | | 8/2001 | Drane et al. | |
| 6,317,474 | B1 | | 11/2001 | Carsello | |
| 6,320,915 | B1 | * | 11/2001 | Stott et al. | 375/340 |
| 6,330,452 | B1 | | 12/2001 | Fattouche et al. | |
| 6,384,773 | B1 | * | 5/2002 | Martin et al. | 342/202 |

(Continued)

OTHER PUBLICATIONS

Fredric J. Harris, "On the Use of Windows for Harmonic Analysis with the Discrete Fourier Transform", Proceedings of the IEEE, vol. 66, No. 1, Jan. 1978, pp. 51-83.

(Continued)

*Primary Examiner*—Jean B. Corrielus
(74) *Attorney, Agent, or Firm*—Edell, Shapiro & Finnan, LLC

(57) ABSTRACT

A technique for transmitting a spread spectrum signal using plural non-contiguous frequency bands separated by segments of frequency spectrum excluded from use involves: generating a digital time-domain spread spectrum signal; converting the time-domain signal to a frequency-domain signal via an FFT; excising a portion of the frequency-domain signal by selectively removing frequency bins of the frequency-domain signal to cause spectral nulling of the transmit signal at the frequencies of the excluded segments; and converting the excised frequency-domain signal to an excised time-domain signal via an inverse FFT, which is then converted to an analog signal for transmission. The non-contiguous spectrum selection technique is implemented in a transmitter that transmits data communication signals or navigation signals, and permits use of plural, non-contiguous frequency bands to transmit a wide bandwidth signals that cannot be transmitted in a continuous frequency band due to constrains in the allocated frequency spectrum available for transmission.

34 Claims, 2 Drawing Sheets

U.S. PATENT DOCUMENTS

| | | | |
|---|---|---|---|
| 6,408,019 B1* | 6/2002 | Pickering et al. | 375/130 |
| 6,445,927 B1 | 9/2002 | King et al. | |
| 6,453,168 B1 | 9/2002 | McCrady | |
| 6,469,665 B2 | 10/2002 | Porcino | |
| 6,470,185 B2 | 10/2002 | Kangas et al. | |
| 6,473,453 B1* | 10/2002 | Wilkinson | 375/143 |
| 6,477,196 B1* | 11/2002 | Swanke et al. | 375/147 |
| 6,486,831 B1 | 11/2002 | Martorana | |
| 6,549,594 B1 | 4/2003 | Chen et al. | |
| 6,598,200 B1* | 7/2003 | Greenwood et al. | 714/774 |
| 6,668,008 B1* | 12/2003 | Panasik | 375/139 |
| 6,868,114 B2* | 3/2005 | Bially et al. | 375/148 |
| 6,952,394 B1* | 10/2005 | Kim et al. | 370/208 |
| 6,975,673 B1* | 12/2005 | Rouquette | 375/149 |
| 7,020,074 B1* | 3/2006 | Rickard et al. | 370/210 |
| 7,031,251 B2* | 4/2006 | Chen et al. | 370/208 |
| 7,031,402 B2* | 4/2006 | Takada | 375/296 |
| 7,039,105 B2* | 5/2006 | Baker et al. | 375/240 |
| 7,080,017 B2* | 7/2006 | Fisher et al. | 704/500 |
| 7,130,356 B2* | 10/2006 | Kaku et al. | 375/295 |
| 2001/0053699 A1 | 12/2001 | McCrady et al. | |
| 2002/0019214 A1* | 2/2002 | Brown et al. | 455/63 |
| 2002/0053985 A1 | 5/2002 | Nesbitt | |
| 2002/0094022 A1* | 7/2002 | Bially et al. | 375/148 |
| 2002/0107028 A1 | 8/2002 | Rantalainen et al. | |
| 2002/0118723 A1 | 8/2002 | McCrady et al. | |
| 2002/0136276 A1* | 9/2002 | Franceschini et al. | 375/148 |
| 2002/0142725 A1* | 10/2002 | Clelland et al. | 455/63 |
| 2002/0155845 A1 | 10/2002 | Martorana | |
| 2002/0172213 A1* | 11/2002 | Laroia et al. | 370/430 |
| 2003/0054845 A1 | 3/2003 | Krasny et al. | |
| 2003/0092448 A1 | 5/2003 | Forstrom et al. | |
| 2003/0146871 A1 | 8/2003 | Karr et al. | |
| 2004/0008617 A1* | 1/2004 | Dabak et al. | 370/208 |
| 2004/0092281 A1* | 5/2004 | Burchfiel | 455/522 |
| 2004/0109508 A1* | 6/2004 | Jeon et al. | 375/260 |
| 2004/0110510 A1* | 6/2004 | Jeon et al. | 455/450 |
| 2005/0254416 A1* | 11/2005 | Laroia et al. | 370/208 |

OTHER PUBLICATIONS

Jeffrey A. Young, "Analysis of DFT-Based Frequency Excision Algorithms for Direct-Sequence Spread-Spectrum Communications", IEEE Transactions on Communications, vol. 46, No. 8, Aug. 1998, pp. 1076-1087.

* cited by examiner

METHODS AND APPARATUS FOR TRANSMITTING NON-CONTIGUOUS SPREAD SPECTRUM SIGNALS FOR COMMUNICATIONS AND NAVIGATION

FIELD OF THE INVENTION

The present invention relates to methods and apparatus for transmitting spread spectrum signals using a non-contiguous spectrum for communication and navigation applications.

DESCRIPTION OF THE RELATED ART

Spread spectrum signals are useful in a variety of communication and navigation applications where precise, reliable signal reception is desired. For example, U.S. Pat. No. 6,453,168, the disclosure of which is incorporated herein by reference in its entirety, discloses a state-of-the-art position location and communication system that provides accurate, reliable three-dimensional position determination of a handheld or portable, spread spectrum communication device within milliseconds without interruption of voice or data communications. Using spread spectrum waveforms and processing techniques, the system is capable of determining position location to an accuracy of less than one meter and communications performance commensurate with the modulation and error correction coding that is employed in a severe multipath environment.

To achieve the desired position accuracy and communication performance, the aforementioned system preferably employs a wide, contiguous bandwidth. Position accuracy is inversely proportional to bandwidth and the square root of the signal-to-noise ratio (SNR). A good strategy to improve position accuracy is to increase both bandwidth and SNR. Ideally, increasing bandwidth is the best way to improve accuracy because of the inverse square root relationship of improved accuracy with increasing SNR. However, because of increasing demands on available frequency spectrum, it is not always feasible to obtain a frequency allocation with enough bandwidth to support the desired location accuracy in one continuous band.

A similar shortcoming applies to the communication of data. A wide, contiguous bandwidth is typically required to support high rate data communications in a spread spectrum system. The ability to use non-contiguous frequency bands would ease the frequency allocation burden in this context as well.

SUMMARY OF THE INVENTION

Therefore, in light of the above, and for other reasons that become apparent when the invention is fully described, an object of the present invention is to enable a wide bandwidth signal to be transmitted using plural, non-contiguous frequency bands.

Another object of the present invention is to simultaneously use two or more non-contiguous frequency bands to transmit direct sequence spread spectrum signals.

It is another object of the present invention to overcome bandwidth constraints caused by an allocated frequency band including non-allocated intervening frequency segments that divide the allocated frequency band into plural non-contiguous frequency bands.

Yet another object of the present invention is to transmit communication signals, such as data, audio, and video signals, and navigation signals, such as time-of-arrival ranging signals, with sufficient bandwidth to meet system requirements.

Still another object of the present invention is to avoid transmitting signal energy in non-allocated frequency bands between allocated portions of the frequency spectrum.

The aforesaid objects are achieved individually and in combination, and it is not intended that the present invention be construed as requiring two or more of the objects to be combined unless expressly required by the claims attached hereto.

In accordance with one aspect of the invention, a system for generating a signal for transmission in non-contiguous frequency bands that are separated by at least one segment of frequency spectrum excluded from use in transmitting the signal includes: a processor that generates a digital time-domain signal; a non-contiguous spectrum selector that converts the digital time-domain signal to a frequency-domain signal, excises a portion of the frequency-domain signal corresponding to the excluded segment(s) of frequency spectrum, and converts the excised frequency-domain signal to an excised time-domain signal; and a digital-to-analog converter that converts the excised time-domain signal to an analog signal for transmission. The digital time-domain signal can be, for example, a baseband direct sequence spread spectrum signal.

The non-contiguous spectrum selector includes: a discrete Fourier transform module, such as a windowed FFT, that converts the digital time-domain signal to the frequency-domain signal; an excision module that selectively removes frequency bins of the frequency domain signal to cause spectral nulling at frequencies of the excluded spectral segments; and an inverse discrete Fourier transform module, such as an inverse FFT, that converts the excised frequency-domain signal to a time-domain signal. A digital mixer can be employed to up-convert the excised time-domain signal to an intermediate frequency signal prior to digital-to-analog conversion.

The non-contiguous spectrum selection technique can be implemented in the transmitter of a modem device used in any of a wide variety of communication devices, such as a group communication devices communicating in a network, or even in devices that only transmit but do not receive signals. By way of non-limiting example, the non-contiguous spectrum selection technique can be implemented in a transmitter that transmits data communication signals or navigation signals, and permits use of plural, non-contiguous frequency bands to transmit a wide bandwidth signals that cannot be transmitted in a continuous frequency band due to constrains in the allocated frequency spectrum available for transmission. In particular, the non-contiguous spectrum selection technique can be used to transmit time-of-arrival ranging pulses for position determination that is useful in wide variety of applications, including location and/or tracking of people and items such as: military personnel and equipment, emergency personnel and equipment, valuable items, vehicles, mobile telephones, children, prisoners and parolees.

Optionally, the receiver receiving a signal transmitted using non-contiguous frequency bands may also include a spectrum selector that excises the portion of the received signal corresponding to the excluded frequency segment(s) by removing from the received signal the same frequency bins removed from the transmitted signal. This excision eliminates interference received in the removed frequency bins without reducing the signal energy.

In accordance with another aspect of the invention, a technique for transmitting a spread spectrum signal using plural non-contiguous frequency bands separated by segments of frequency spectrum excluded from use includes: generating a digital time-domain spread spectrum signal; converting the time-domain signal to a frequency-domain signal (e.g., via an FFT); excising a portion of the frequency-domain signal by selectively removing frequency bins of the frequency-domain signal to cause spectral nulling of the transmit signal at the frequency of the excluded segments; and converting the excised frequency-domain signal to an excised time-domain signal (e.g., via an inverse FFT), which is then converted to an analog signal for transmission. Optionally, the method may further include excising, at the receiver, the portion of the received signal corresponding to the excluded frequency segment(s).

The above and still further objects, features and advantages of the present invention will become apparent upon consideration of the following definitions, descriptions and descriptive figures of specific embodiments thereof wherein like reference numerals in the various figures are utilized to designate like components. While these descriptions go into specific details of the invention, it should be understood that variations may and do exist and would be apparent to those skilled in the art based on the descriptions herein.

DESCRIPTION OF THE PREFERRED EMBODIMENTS

Figure 1:
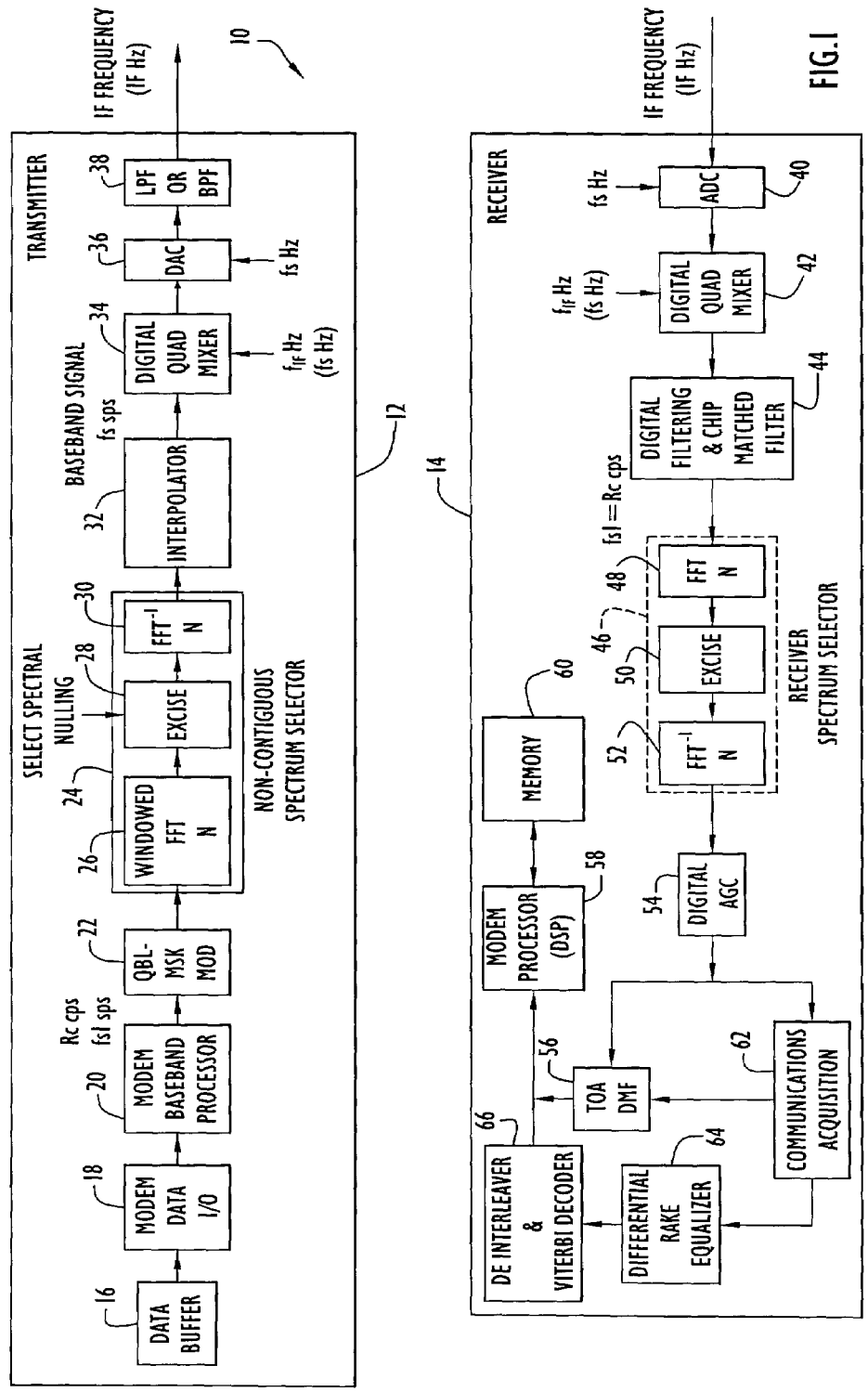
FIG. 1 is a functional block diagram illustrating a modem architecture employing non-contiguous spectrum selection in accordance with an exemplary embodiment of the present invention.
Figure 2:
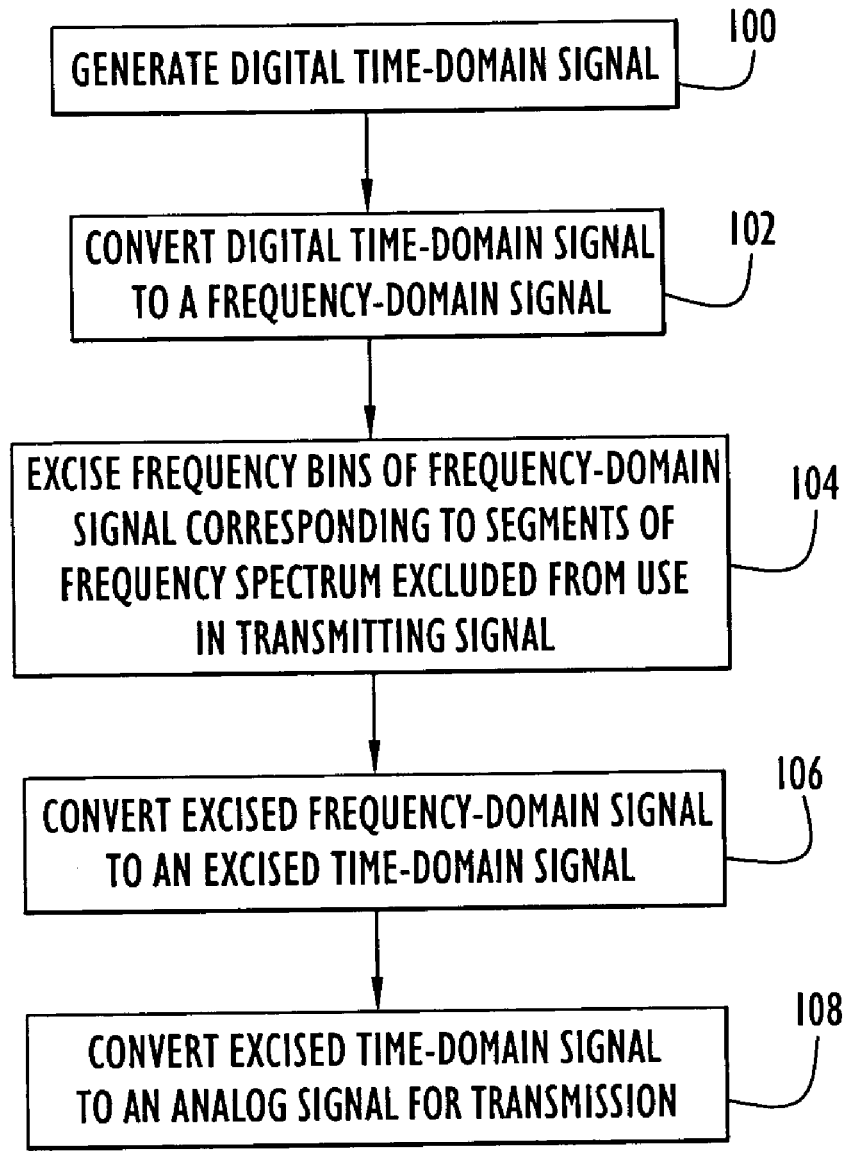
FIG. 2 is a function flow diagram illustrating non-contiguous spectrum selection operations.

The following detailed explanations of FIGS. 1 and 2 and of the preferred embodiments reveal the methods and apparatus of the present invention. The described system overcomes the aforementioned difficulties caused by the unavailability of sufficient contiguous frequency spectrum by making it feasible to use non-contiguous frequency bands for spread spectrum data communication systems and navigation systems, such as those that employ time-of-arrival (TOA) ranging for position determination. As a result, it is easier to obtain frequency allocations for improved ranging accuracy and higher data rate communications because increased bandwidth need not be contiguous. In addition, the performance achievable using contiguous bandwidth in present state-of-the-art TOA ranging and communications systems can be achieved using non-contiguous pieces of the spectrum. As used herein, the term "non-contiguous frequency bands" refers to two or more frequency bands that are separated in the frequency spectrum by intervening segments or bands of the frequency spectrum.

In accordance with an important aspect of the described system, a non-contiguous spectrum selection (NCSS) operation is performed to remove one or more segments of frequency spectrum from a signal to be transmitted to avoid transmitting RF energy in one or more intervening frequency bands not allocated for use in transmitting the signal (e.g., because a frequency allocation could not be secured). The resulting non-contiguous frequency bands are then used collectively and simultaneously to transmit a wide bandwidth signal, such as a direct sequence spread spectrum signal, employing the collective bandwidth of the non-contiguous frequency bands. The NCSS operation has potential utility in any communication device or system involving transmission of wireless signals where bandwidth is otherwise constrained by the availability of frequency spectrum. As used herein and in the claims, a communication device is any device capable of transmitting and/or receiving signals, including but not limited to: a fixed-position or mobile RF transmitter, a handheld or body-mounted radio; any type of wireless telephone (e.g., analog cellular, digital cellular or satellite-based); a pager or beeper device; a PDA; a radio carried on, built into or embedded in a ground-based or airborne vehicle; a satellite-mounted transmitter; or any electronic device equipped with wireless transmission capabilities, including multimedia terminals capable of transmitting audio, video and data information.

For purposes of illustration, the NCSS operation is described herein in the context of a direct sequence spread spectrum modem. However, it will be understood that the described technique can be employed in virtually any communication device required to transmit and receive wireless (free space) signals and is not limited to any particular modem configuration. More generally, the NCSS technique is not limited to use within a modem and can be employed in any communication device that transmits wireless signals, irrespective of whether the communication device also receives signals.

Referring to FIG. 1, a block diagram of a spread spectrum modem 10 that performs non-contiguous spectrum selection (NCSS) is shown. Modem 10 includes a transmitter 12 and a receiver 14. Transmitter 12 functions to convert an outbound digital signal to an intermediate frequency, spread spectrum signal that is subsequently up-converted to RF and transmitted via an antenna (not shown). Receiver 14 processes a received signal after down-conversion to IF and essentially recovers the transmitted waveform and information contained therein.

The signal to be transmitted or received by modem 10 can be any of a variety of communication or navigation signals. For example the signal can be a communication signal containing data, audio (voice) or video information. The signal can also be a signal used in navigation, such as a ranging pulse used to determine the position of a communication device or the range to another device or object by precisely measuring time of arrival. Examples of such signals are described in U.S. Pat. No. 6,453,168 described above and in U.S. patent application Ser. No. 09/777,625 (Pub. No. 2001/0053699 A1), the disclosure of which is incorporated herein by reference in its entirety. More particularly, the systems described in these documents employ a two-way, round-trip ranging message scheme in which the time of arrive of the ranging messages is accurately determined to yield accurate range estimates used to calculate the position of a mobile radio via trilateration. A master mobile radio transmits outbound ranging messages to plural reference radios. The reference radios respond by transmitting reply ranging messages each indicating the location of the reference radio. Upon reception of the reply ranging message, the master radio determines the signal propagation time, and hence range, by subtracting a known turn around time (i.e., the time between reception of the outbound ranging message and the transmission of the reply ranging message) and internal processing delays from the elapsed time between transmission of the outbound ranging message and the time of arrival of the reply message. In this manner, the individual radios do not need to be synchronized to a common time reference, thereby eliminating the need for highly accurate system clocks required in conventional time-synchronized systems. The brief ranging messages can be interleaved with voice and data messages in a non-intrusive manner to provide position location capabilities without disruption of voice and data communications. For example, a messaging protocol similar to that used in Carrier Sense Multiple Access with Collision Avoidance (CSMA/CA) can be used.

To provide high accuracy range estimates, the time of arrival of the ranging messages are precisely estimated. By performing internal delay calibration, errors caused by difficult-to-predict internal transmitter and receiver delay variations can be minimized. These systems use state-of-the-art spread spectrum chipping rates and bandwidths to reduce multipath interference, taking advantage of existing hardware and software to carrying out a portion of the TOA estimation processing. Leading edge curve fitting is used to accurately locate the leading-edge of an acquisition sequence in the ranging message in order to further reduce the effect of multipath interference on TOA estimates. Frequency diversity is used to orthogonalize multipath interference with respect to the direct path signal, wherein an optimal carrier frequency is used to estimate the TOA to minimize the impact of multipath interference.

Further, the systems described in these patent documents are self-healing. Unlike conventional systems that require communication with a set of fixed-location reference radios, these systems can use a set of fixed and/or mobile reference radios. The set of radios relied upon to determine the location of a mobile communication device can vary over time depending on transmission conditions and the location of the mobile communication device. Any combination of fixed or mobile radios of known positions can be used as the reference radios for another mobile radio in the system, thereby providing adaptability under varying conditions. The ranging and position determining technique is useful in a wide variety of applications, including location and/or tracking of people and items such as: military personnel and equipment, emergency personnel and equipment, valuable items, vehicles, mobile telephones, children and prisoners.

Referring again to the modem architecture shown in FIG. 1, a processor (not shown) generates an initial digital signal to be transmitted, and the digital signal is buffered in data buffer 16. The transmitter's modem data I/O 18 receives the digital signal from buffer 16 and supplies the signal to a modem baseband processor 20. Modem baseband processor 20 performs modulation to convert the bits of the input digital signal into symbols at a symbol rate of $f_{s1}$ symbols per second (sps) and also applies spread spectrum chipping to the symbols at a chipping rate $R_c$ chips per second (cps) to produce a digital baseband direct sequence spread spectrum signal comprising a stream of samples of chips. Modem baseband processor 20 may also conventionally include a convolutional encoder that applies coding to the bits and performs an interleaving function that essentially scrambles the bits to achieve better performance. Each chip is then shaped by the QBLMSK (Quasi Band Limited Minimum Shift Keying) modulator 22 and supplied to a non-contiguous spectrum selector 24. The resulting baseband spread spectrum signal is a time-domain signal that, if further processed in a conventional manner (i.e., converted to an analog signal, and up-converted to intermediate frequency and then RF), would be transmitted over a continuous frequency band. Selector 24 essentially removes frequency components of the baseband spread spectrum signal that correspond to the segments of the frequency spectrum that cannot be used for signal transmission within the overall frequency band of the signal.

Selector 24 includes a discrete Fourier transform module 26, an excision module 28, and an inverse discrete Fourier transform module 30. Discrete Fourier transform module 26 can be a windowed fast Fourier transform (FFT), while inverse discrete Fourier transform module 30 can be an inverse FFT. Each of these components will be described as they relate to the NCSS technique and within the context of the spread spectrum modem.

The signal from the baseband modulator (i.e., the stream of baseband chip samples) is supplied from QBLMSK modulator 22 to selector 24, where the baseband digital signal is transformed from the time-domain into the frequency domain by the length N, windowed FFT 26. The length N of the FFT is determined by the desired frequency resolution of the application being addressed, where $F_r$ is the frequency resolution and equals $F_s/N$, and $F_s$ is the sampling rate. Each FFT frequency-domain sample corresponds to a frequency bin, with the complete set of frequency bins spanning the spectrum to be used in transmitting the signal. Windowing is used to shape the frequency response of the FFT bins by providing lower sidelobes at the expense of widening the bandwidth of the bins. Any of the standard windows can be used depending on the application and frequency allocation requirements, such as, for example, any of those described by Harris in "On the Use of Windows for Harmonic Analysis with the Discrete Fourier Transform," Proceedings of the IEEE, Vol. 66, No. 1, the disclosure of which is incorporated herein by reference in its entirety.

The excision operation performed by excision module 28 involves removing the FFT bins at frequencies where the signal is to be excluded using techniques similar to those described in the open literature for the interference excision application, such as, for example, the excision techniques described by Young in "Analysis of DFT-Based Frequency Excision Algorithms for Direct-Sequence Spread-Spectrum Communications," IEEE Transactions on Communications, Vol. 46, No. 8, the disclosure of which in incorporated herein by reference in its entirety. As shown in FIG. 1, excision module 28 is programmed or receives an input signal that selectively indicates the spectral nulling required to prevent transmission in the non-allocated segments of the frequency spectrum, and excises the corresponding frequency bins in the frequency-domain signal. The excision operation generally involves adjusting or setting the signal level of the excised bins to a predetermined level. For example, to completely eliminate transmission of energy in a particular band, the signal level is adjusted to zero in the excised frequency bins. Optionally, if transmission of some amount of energy is permitted in the non-allocated band, the signal level can be set to some small value other to zero within the permitted limit; however, more typically, the signal level is zeroed in the excised frequency bins. Thus, in the context of non-contiguous spectrum selection, the terms "excise," "exclude," "null," "notch," and "remove," (and other forms thereof) are used herein in relation to segments of the frequency spectrum and associated frequency bins to refer to adjusting of the signal level to a low level, typically zero.

Importantly, the excision performed by selector 24 is fundamentally different from known excision operations. Conventionally, excision is performed in receivers to eliminate narrowband interference or jamming. Typically, the received signal is analyzed in the frequency domain, and the signal level of each frequency bin is examined. Those frequency bins with exceptionally high signal levels are assumed to be interference or a jamming signal and are either eliminated by zeroing the signal level for those frequency bins or adjusting the signal level to some predetermined value. Unlike interference excision, the excision operation of the invention is performed in the transmitter on signals to be transmitted in order to blank or notch out portions of the signal corresponding to unavailable segments of the frequency spectrum within the frequency band of the signal (e.g., bands of frequencies at which transmission of electromagnetic energy is not permitted due to allocation of those frequencies to a different use). Whereas interference excision involves excising frequency bins based on a received signal level, the excision operation of the present invention involves excising or removing a specified set of frequency bins in a transmit signal to selectively perform spectral nulling in predetermined portions of the frequency spectrum corresponding to non-allocated frequency bands.

In practice, such allocation issues commonly arise. For example, the frequency band from 138-174 MHz is allocated for public safety communications. If this entire band could be used, transmission of signals having a bandwidth up to 36 MHz would be possible. However, a 4 MHz band from 144-148 MHz is excluded from this allocation, making the total available bandwidth 32 MHz, including a lower 6 MHz band and an upper 26 MHz band. Other public safety bands have similar restrictions. Suppose, for example, that a bandwidth of 32 MHz is required to meet system performance requirements. This bandwidth cannot be obtained continuously, since the largest continuous frequency spectrum available is 26 MHz. In accordance with the non-contiguous spectrum selection technique, if a 32 MHz bandwidth is required to meet performance requirements, this bandwidth can be achieved by generating a signal that spans the entire 36 MHz band and then notching out the 4 MHz band from 144-148 MHz, leaving a net bandwidth of 32 MHz.

Importantly, system performance is a function of the total bandwidth and is relatively insensitive to whether the bandwidth is available in a continuous band or is achieved by summing the bandwidth of two or more non-contiguous frequency bands. Thus, the frequency spectrum of the transmitted signal can be non-contiguous and broken up to an arbitrary extent provided the resulting combined bandwidth from the non-contiguous frequency bands meets the bandwidth requirements of the system. Removal of portions of the signal spectrum does impact the shape of the resulting pulse, since certain frequency components have been removed. The change in pulse shape, relative to the pulse shape of a continuous bandwidth signal may result in some performance degradation where the pulse shape impacts processing of the signal at the receiver, e.g., where pulse shape curve fitting is used to precisely determine the time of arrival of a pulse.

As will be appreciated from the foregoing, the bandwidth of the frequency-domain signal generated by the FFT should span the overall band that includes all of the non-contiguous frequency bands used for transmission, from the lowest frequency of the lowest band to the highest frequency of the highest band. Thus, the time-domain signal and FFT parameters must be selected accordingly. A brief example is presented for clarity where the bandwidth of an existing state-of-the-art system is doubled. The following assumptions are made with respect to FIG. 1 for purposes of the example and hold for both communications and ranging applications.

Spread spectrum chip rate=$R_c$=64 Mcps,
Initial sample rate=$F_{s1}$=128 Msps,
N=128,
Hanning window,
Interpolated sample rate=$F_s$=256 Msps,
Intermediate frequency=$F_{IF}$=70 MHz, and
Low Pass Filter (LPF) at the Digital-to-Analog Converter (DAC) output.

With these assumptions, the frequency resolution at the FFT output is:

$F_r$=1.5×(128 Msps/128)=1.5 MHz.

The transmitted signal has a −40 dB bandwidth of 64 MHz. Segments of the spectrum that are 1.5 MHz wide can be eliminated from the signal in order to reduce the bandwidth of the frequency allocation request to reach an acceptable compromise with the government frequency allocation authority.

Referring again to FIG. 1, after excision, a length N inverse FFT 30 is used to transform the signal back into the time domain, resulting in an excised baseband digital spread spectrum time-domain signal issuing from selector 24. The excised time-domain signal then flows through the rest of the transmitter path as if it were a standard communication or navigation (e.g., ranging) signal. In the exemplary modem shown in FIG. 1, an interpolator 32 adjusts the sampling rate of the samples from selector 24 to a rate that matches a downstream mixer and digital-to-analog converter, increasing the rate from a frequency $f_{s1}$ to a frequency $f_s$. The interpolated signal, which is at baseband, is supplied to a digital quad mixer 34 that digitally mixes the baseband signal with an intermediate frequency (IF) signal to up-convert the baseband signal to a digital IF signal. The digital IF signal is then converted to an analog signal by digital-to-analog converter 36 and passed through a reconstruction filter 38 comprising a low pass filter or a bandpass filter to produce an output IF signal. After up-conversion to RF, the signal is transmitted via an antenna (not shown). Note that the transmitted signal power can be amplified to compensate for the reduction in signal power due to the excision process.

The operations performed in connection with the non-contiguous spectrum selection technique are summarized in the functional flow diagram shown in FIG. 2. Specifically, a digital time-domain signal is generated (operation 100) and converted to a frequency domain signal, e.g., by a windowed FFT (operation 102). Excision is then performed on the frequency-domain signal by removing the frequency bins corresponding to the segment(s) of the frequency spectrum excluded from use in transmitting the signal (operation 104). The excised frequency-domain signal is then converted back to a time-domain signal (operation 106) and converted to an analog signal for transmission (operation 108).

The receiver (demodulator) 14 shown in FIG. 1 is configured to process the spread spectrum signal at the chip rate generated by the transmitter (modulator) 12. Notably, the excised signal transmitted in the aforementioned manner can be received by a conventional receiver, and no receiver modifications are necessary to process the excised transmitted signal (although, optionally, the receiver may include a spectrum selector as described below). The degradation of the strength of the correlation function from the spread spectrum signal in the demodulator (and therefore the ability to perform time-of-arrival ranging and data communication) is proportional to the amount of spectrum excised in the modulator. The aforementioned article by Young shows that the knee of the "percentage of FFT bins excised versus loss" curve is roughly (50%, 7.5 dB) indicating a substantial range of operation for the non-contiguous spectrum selection technique. However, it should be noted that this degradation is relative to a non-excised signal, which therefore has a greater bandwidth. As previously explained, an excised signal whose non-contiguous frequency bands result in a total bandwidth of a certain value has very little degradation relative to a continuous spectrum signal of that same bandwidth.

Receiver 14 is supplied to the received IF signal after down-conversion from RF and converts the IF signal to a digital IF signal via analog-to-digital converter 40. Digital quad mixer 42 down-converts the digital IF signal to baseband, and the sample rate of the digital baseband signal is adjusted from $f_{s1}$ to $f_s$ by digital filtering and chip matched filter 44.

Optionally, receiver 14 can include a receiver spectrum selector 46 (selector 46 is shown in dashed lines to indicate that it is optional). If the receiver spectrum selector is omitted, the receiver essentially operates in a conventional manner or, in the exemplary case shown in FIG. 1, the receiver operates in the manner described in the aforementioned patent documents. The receiver spectrum selector operates as follows. Since certain segments of the frequency spectrum of the transmitted signal were notched out or excluded by spectral nulling of specified frequency bins in the transmitter, no energy was transmitted in these segments of the frequency spectrum. Accordingly, one would not expect any signal energy to be received in the corresponding frequency bins of the received signal (accounting for known Doppler shifts) and thus any energy received in these frequency bins could be assumed to be noise or interference. Consequently, the receiver spectrum selector can advantageously notch out or exclude the same frequency bins notched out by the spectrum selector of the transmitter, thereby eliminating any noise or interference received in these frequency bins without removing any components of the transmitted signal.

More specifically, receiver spectrum selector 46 includes: a discrete Fourier transform module 48 (e.g., an FFT) that converts the digital baseband time-domain signal into a frequency-domain signal; an excision module 50 that excises the frequency bins of the frequency-domain signal that correspond to those frequency bins excised from the signal at the transmitter; and an inverse discrete Fourier transform module 52 (e.g., an inverse FFT) that converts the excised frequency-domain signal to an excised time-domain signal at baseband.

Optionally, receiver spectrum selector 46 can also perform conventional interference excision by evaluating the signal levels of the frequency bins and adjusting the signal level of those frequency bins that exceed a predetermined level. In this case, the notching of the non-allocated segments of the frequency spectrum is advantageous for the additional reason that the notched frequency bins need not be evaluated for purposes of interference excision, thereby reducing the processing and time required to perform interference excision. Interference excision is useful in non-contiguous frequency bands in which the signal is received, particularly if narrowband interference or jamming is expected. A narrowband interferer typically covers one or a few frequency bins. With a spread spectrum signal having a relatively wide bandwidth spanning hundreds or thousands of frequency bins, the receiver can afford to lose the small portion of the overall signal corresponding to the narrowband interference without substantial degradation to detection of the spread spectrum signal. Even if the receiver does not include a spectrum selector for excising non-allocated frequency segments from the received signal, the receiver may still include a conventional interference excision module in situations where narrowband interference or jamming is likely or expected.

In the exemplary modem shown in FIG. 1, the system is capable of transmitting communication signals (e.g., data, audio/voice, video, etc.) interleaved with time-of-arrival ranging signals used for navigation. Thus, after apply gain control to the excised digital baseband received signal in digital automatic gain control (AGC) module 54, the signal is supplied both to a communications acquisition module 62 and a time-of-arrival digital matched filter module 56. When either a communication signal or a ranging signal is received, the communication acquisition module 62 acquires the timing of the signal. In the case of a ranging signal, the communications acquisition module triggers the TOA DMF module 56 to precisely determine the time of arrival of the ranging pulse. Once the TOA DMF module 56 correlates the ranging signal by matching the signal with the appropriate correlation function, the resulting signal timing information is sent to the modem processor 58 (supported by memory 60), which computes range and determines position. A detailed description of an example of these modules is contained in the aforementioned patent documents.

For communication signals, the acquired signal is supplied from the communications acquisition module 62 to a differential rake equalizer 64 that identifies the predominant multipath channels and sums the multipath signals appropriately time-delayed to increase the combined signal-to-noise ratio for communications performance improvement. A de-interleaver and Viterbi decoder 66 essentially decodes and deinterleaves (descrambles) the coding and interleaving functions applied in the modem baseband processor. The resulting digital signal is then supplied to modem processor 58 where the final bits are accumulated and supplied to a destination application (e.g., a data, voice or video application).

The described invention has applicability in virtually any communication or navigation system that can benefit from spread spectrum signals whose desired bandwidth is greater than what is permitted by the available contiguous frequency spectrum or where insufficient contiguous spectrum is available to obtain the signal reception quality needed to meet system requirements, such as signal timing accuracy, data rate, bit error rate, multipath rejection capability, and likelihood of signal acquisition/detection.

The NCSS technique can be implemented in a system that easily fits within the physical footprint of mobile communication device, such as a handheld spread spectrum radio, permitting the system to be used in a wide variety of applications. Where the system supports both communications and navigation, as in the exemplary embodiment, the system can be used to provide situation awareness in military exercises, to determine and track the location of military personnel and/or equipment during coordination of field operations. This would be particularly useful in scenarios where GPS signals are weak or unavailable due to atmospheric conditions, terrain or location of the radio inside a building, or to augment and enhance the accuracy of GPS position information. The position information can be used by a commander to dynamically map the current position of personnel and equipment and to coordinate further movements. Further, individual mobile radios can receive and display position information for other related personnel, so that soldiers in the field are provided with situation awareness for their immediate surroundings.

The NCSS technique of the present invention can also be used to enhance systems that locate and track non-military personnel and resources both indoors or outdoors, including but not limited to: police engaged in tactical operations; firefighters located near or within a burning building; medical personnel and equipment in a medical facility or en route to an emergency scene; and personnel involved in search and rescue operations. The NCSS technique is also useful in systems used to track high-value items by tagging items or embedding a mobile radio in items such as personal computers, laptop computers, portable electronic devices, luggage (e.g., for location within an airport), briefcases, valuable inventory, and stolen automobiles.

In urban environments, where conventional position determining systems have more difficulty operating, the NCSS technique can be used to support systems that track fleets of commercial or industrial vehicles, including trucks, buses and rental vehicles equipped with mobile radios. Tracking of people carrying a mobile communication device is also desirable in a number of contexts, including, but not limited to: children in a crowded environment such as a mall, amusement park or tourist attraction; location of personnel within a building; location of prisoners in a detention facility; or to track the movements of parolees. The mobile radio could be carried on the body by incorporating the radio into clothing, such as a bracelet, a necklace, a pocket or the sole of a shoe. The NCSS technique can also be applied in systems used in locating the position of cellular telephones. This capability could also be used to assist in cell network management (e.g., in cell handoff decisions).

Of course, the NCSS technique is equally applicable in communication devices and networks of communication devices that transmit only communication signals (e.g., data, audio, video), only navigation signals, or virtually any type of spread spectrum or wideband signal. Further, the NCSS technique can be used in fixed-position communication devices that transmit as well as mobile communication devices.

While the present invention has been described above in the context of a system that transmits and receives electromagnetic signals through the air, it will be appreciated that the two-way round-trip ranging technique, including the internal delay calibration and TOA processing can be used in other mediums and with other types of signals where frequency allocation restrictions exist, including, but not limited to: electromagnetic signals transmitted through solid materials, water or in a vacuum; pressure waves or acoustic signals transmitted through any medium (e.g., seismic, sonar or ultrasonic waves).

Having described preferred embodiments of new and improved methods and apparatus for transmitting non-contiguous spread spectrum signals for communications and navigation, it is believed that other modifications, variations and changes will be suggested to those skilled in the art in view of the teachings set forth herein. It is therefore to be understood that all such variations, modifications and changes are believed to fall within the scope of the present invention as defined by the appended claims. Although specific terms are employed herein, they are used in a generic and descriptive sense only and not for purposes of limitation.

What is claimed is:

1. A system for generating a single-carrier wideband signal for transmission in non-contiguous frequency bands that are separated by at least one segment of frequency spectrum excluded from use in transmitting the signal, comprising:
   a processor that generates a digital time-domain signal;
   a non-contiguous spectrum selector that converts the digital time-domain signal to a frequency-domain signal that includes the non-contiguous frequency bands and the at least one segment of frequency spectrum, excises a portion of the frequency-domain signal corresponding to the at least one segment of frequency spectrum, and converts the excised frequency-domain signal to an excised time-domain signal that includes signal components in the non-contiguous frequency bands, wherein the excised time-domain signal is a single-carrier wideband signal having a bandwidth comprising a collective bandwidth of the non-contiguous frequency bands used for transmission.

2. The system of claim 1, wherein the non-contiguous spectrum selector comprises:
   a discrete Fourier transform module that converts the digital time-domain signal to the frequency-domain signal, wherein the frequency-domain signal comprises a plurality of frequency-domain samples corresponding to respective frequency bins;
   an excision module that selectively removes frequency bins to cause spectral nulling at the at least one segment of frequency spectrum excluded from signal transmission; and
   an inverse discrete Fourier transform module that converts the excised frequency-domain signal to the excised time-domain signal.

3. The system of claim 2, wherein the discrete Fourier transform module comprises a fast Fourier transform (FFT) and the inverse discrete Fourier transform module comprises an inverse FFT.

4. The system of claim 3, wherein the discrete Fourier transform module includes windowing to shape the frequency response of the frequency bins.

5. The system of claim 1, wherein digital time-domain signal is a baseband signal.

6. The system of claim 5, further comprising:
   a digital mixer that up-converts the excised time-domain signal to an intermediate frequency signal; and
   a digital-to-analog converter configured to convert the intermediate frequency signal to an analog signal for transmission.

7. The system of claim 6, further comprising a reconstruction filter that receives the analog signal from the digital-to-analog converter and supplies a filtered intermediate signal to an RF transmission module.

8. The system of claim 1, wherein the signal is a single, direct sequence spread spectrum signal.

9. The system of claim 8, wherein the digital time-domain signal comprises a sequence of samples of chips.

10. The system of claim 1, wherein the signal includes data for transmission to a communication device.

11. The system of claim 1, wherein the signal is a ranging waveform for determining a range between two communication devices.

12. The system of claim 1, further comprising a receiver comprising:
   an analog-to-digital converter that converts a received signal to a received digital time-domain signal; and
   a receiver spectrum selector that converts the received digital time-domain signal to a received frequency-domain signal, excises a portion of the received frequency-domain signal corresponding to the at least one segment of frequency spectrum, and converts the excised received frequency-domain signal to an excised, received time-domain signal.

13. The system of claim 12, further comprising a time of arrival processor that determines a time of arrival of the received signal from the excised, received time-domain signal.

14. The system of claim 12, further comprising a communications acquisition processor that acquires the received signal from the excised, received time-domain signal.

15. The system of claim 12, wherein the receiver spectrum selector performs interference excision.

16. The system of claim 1, wherein the system comprises a modem including a transmitter and a receiver, wherein the transmitter includes the non-contiguous spectrum selector.

17. The system of claim 1, wherein the system comprises a communication device that includes the processor and the non-contiguous spectrum selector.

18. The system of claim 17, wherein the communication device is a mobile communication device.

19. The system of claim 1, wherein the system comprises a plurality of communication devices communicating in a network.

20. The system of claim 1, wherein the non-contiguous spectrum selector excises the portion of the frequency-domain signal corresponding to the at least one segment of the frequency spectrum, independent of a signal level of the digital time-domain signal or frequency-domain signal.

21. The system of claim 1, wherein a bandwidth of the frequency domain signal generated by the non-contiguous spectrum selector corresponds to an overall band that extends from a lowest frequency of a lowest of the non-contiguous frequency bands to a highest frequency of a highest of the non-contiguous frequency bands.

22. The system of claim 1, wherein a pulse shape of the single-carrier wideband signal is changed by excision of the portion of the frequency-domain signal.

23. A method for generating a single-carrier wideband signal for transmission in non-contiguous frequency bands that are separated by at least one segment of frequency spectrum excluded from use in transmitting the signal, comprising:
(a) generating a digital time-domain signal;
(b) converting the digital time-domain signal to a frequency-domain signal that includes the non-contiguous frequency bands and the at least one segment of frequency spectrum;
(c) excising a portion of the frequency-domain signal corresponding to the at least one segment of frequency spectrum to produce an excised frequency-domain signal that includes signal components corresponding to the non-contiguous frequency bands;
(d) converting the excised frequency-domain signal to an excised time-domain signal, wherein the excised time-domain signal is a single-carrier wideband signal having a bandwidth comprising a collective bandwidth of the non-contiguous frequency bands used for transmission; and
(e) converting the excised time-domain signal to an analog signal for transmission.

24. The method of claim 23, wherein:
(b) includes converting the digital time-domain signal to the frequency-domain signal via a windowed fast Fourier transform (FFT), wherein the frequency-domain signal comprises a plurality of frequency-domain samples corresponding to respective frequency bins;
(c) selectively removing frequency bins to cause spectral nulling at the at least one segment of frequency spectrum excluded from signal transmission; and
(d) includes converting the excised frequency-domain signal to the excised time-domain signal via an inverse FFT.

25. The method of claim 23, wherein digital time-domain signal is a baseband signal.

26. The method of claim 25, further comprising:
(f) up-converting the excised time-domain signal to an intermediate frequency signal.

27. The method of claim 23, wherein the signal is a single, direct sequence spread spectrum signal, and the digital time-domain signal comprises a sequence of samples of chips.

28. The method of claim 23, wherein the signal includes data for transmission to a communication device.

29. The method of claim 23, wherein the signal is a ranging waveform for determining a range between two communication devices.

30. The method of claim 23, further comprising:
(f) converting a received signal to a received digital time-domain signal;
(g) converting the received digital time-domain signal to a received frequency-domain signal;
(h) excising a portion of the received frequency-domain signal corresponding to the at least one segment of frequency spectrum; and
(i) converting the excised received frequency-domain signal to an excised, received time-domain signal.

31. The method of claim 30, further comprising:
(j) determining a time of arrival of the received signal from the excised, received time-domain signal.

32. The method of claim 23, wherein (c) includes excising the portion of the frequency-domain signal corresponding to the at least one segment of the frequency spectrum, independent of a signal level of the digital time-domain signal or frequency-domain signal.

33. The method of claim 23, wherein a bandwidth of the frequency domain signal corresponds to an overall band that extends from a lowest frequency of a lowest of the non-contiguous frequency bands to a highest frequency of a highest of the non-contiguous frequency bands.

34. The method of claim 23, wherein a pulse shape of the single-carrier wideband signal is changed by excision of the portion of the frequency-domain signal.

* * * * *